United States Patent Office 2,978,311
Patented Apr. 4, 1961

2,978,311

PROCESSES FOR PRODUCING FERTILIZERS

James E. Seymour, Collinsville, Ill., assignor, by mesne assignments, to Central Farmers Fertilizer Company, Chicago, Ill., a corporation of Illinois No Drawing. Filed Mar. 29, 1955, Ser. No. 497,786

3 Claims. (Cl. 71—33)

This invention relates to the production of fertilizers and more particularly to an improved process for manufacturing phosphatic and mixed fertilizers.

Broadly, the invention provides for the production of phosphatic, NP and NPK fertilizers without recourse to conventional acidulation processes to make the phosphatic material available. Thus, one object of the invention is to provide an improved fertilizer process in which no acid need be added for operability.

Another object is to provide such a process capable of employing a wide variety of starting materials in such manner that a wide variety of high analysis products may be obtained.

A further object is to devise a fertilizer process wherein production and material costs per unit of plant food are unusually low.

Yet another object is to provide such a process capable of producing fertilizer products of excellent condition without the necessity of a curing step.

I accomplish these objects by subjecting a metaphosphate selected from the group consisting of calcium metaphosphate, potassium metaphosphate and sodium metaphosphate to elevated temperature and superatmospheric pressure while in intimate contact with water and a compound capable of reacting with phosphoric acid. Under these conditions, the metaphosphate is hydrolyzed to the corresponding primary orthophosphate in accordance with the following typical equation:

(1) $Ca(PO_3)_2 + 3H_2O \xrightarrow{\text{heat and pressure}} CaH_4(PO_4)_2 \cdot H_2O$ I have observed that the primary orthophosphates tend to disassociate into the corresponding secondary phosphate and phosphoric acid. From this observation, and contrary to current beliefs in the industry, it appears that conventional ammoniation of superphosphate (monocalcium orthophosphate) involves the reaction of ammonia with phosphoric acid accompanied by formation of the dicalcium phosphate. I have discovered that, under the elevated temperature and pressure conditions employed in the present invention, the primary orthophosphate produced by hydrolysis of the metaphosphate will react not only with a fertilizer material providing neutralizing ammonia but also with any fertilizer material capable of reacting with phosphoric acid. I am thus able to employ calcium metaphosphate, water and phosphate rock under elevated temperature and pressure to produce a fertilizer comprising predominantly dicalcium phosphate. The metaphosphate is hydrolyzed to monocalcium orthophosphate in accordance with Equation 1. The monocalcium orthophosphate tends to disassociate:

(2) $CaH_4(PO_4)_2 \cdot H_2O \xrightarrow{H_2O \text{ and heat}} CaHPO_4 + H_3PO_4$ The phosphate rock is acidulated to dicalcium phosphate by the phosphoric acid:

(3) $Ca_3(PO_4)_2 + H_3PO_4 \longrightarrow 3CaHPO_4$ thus upsetting the equilibrium of Equation 2 so that the monocalcium orthophosphate is completely disassociated.

From Equations 1-3, it will be seen that autoclaving of molar proportions of calcium metaphosphate and phosphate rock in the presence of sufficient water for complete hydrolysis of the metaphosphate results in production, by a single manipulative step, of a fertilizer comprising substantially entirely dicalcium phosphate.

Instead of phosphate rock, I may employ limestone, dolomite, anhydrous ammonia, commercial ammoniating solutions and like fertilizer materials. In all cases, the metaphosphate, water and the compound for reaction with phosphoric acid are all charged into an autoclave and the charge then subjected to agitation, heat and pressure so that the hydrolysis reaction and neutralization of the phosphoric acid proceed substantially concurrently.

While in theory it is only necessary to have in the reaction mixture the amount of water necessary for substantially complete hydrolysis (that is, a water-to-metaphosphate ratio of .18). I have discovered that it is highly advantageous to employ a considerable excess of water, ranging up to approximately 4 times the stoichiometric requirement (that is, up to a water-to-metaphosphate ratio of .72). While the reason for improved results with an excess of water are not fully understood, it appears probable that the increased liquid phase aids in disassociation of the primary orthophosphate and therefore increases the rate of reaction between phosphoric acid and the neutralizing ingredient.

In the following examples, the calcium metaphosphate is computed as 64% $P_2O_5$, the phosphate rock as 35% $P_2O_5$ (77% BPL). The phosphate rock should preferably be ground rock of a particle size such that 70-80% will pass a 200 mesh screen. In general, the reaction rate increases as the particle size is decreased.

*Example 1*

| | Parts by weight |
|---|---|
| Calcium metaphosphate | 77.7 |
| Ammonium hydroxide solution (28% $NH_3$) | 40.0 |

The ammonium hydroxide solution and the metaphosphate were combined in a laboratory scale autoclave and subjected to a temperature of 259° F. and pressure of 20 pounds per square inch for a period of 10 minutes. The product then removed from the autoclave was dry and fully reacted. Analysis 12 days after manufacture gave:

| | Percent |
|---|---|
| Moisture | 8.74 |
| Nitrogen | 5.75 |
| Total $P_2O_5$ | 49.75 |
| Available $P_2O_5$ | 48.85 |
| Basicity to methyl orange | 3.0 |

*Example 2*

| | Parts by weight |
|---|---|
| Calcium metaphosphate | 68.75 |
| Ammonium hydroxide solution (28% $NH_3$) | 31.25 |

The metaphosphate and ammoniating solution were charged into an autoclave and subjected to a temperature of 259° F. and a pressure of 20 pounds per square inch for a period of ten minutes. The product analyzed:

| | Percent |
|---|---|
| Moisture | 2.8 |
| Nitrogen | 8.30 |
| Total $P_2O_5$ | 50.75 |
| Available $P_2O_5$ | 49.75 |
| Basicity to methyl orange | 10.4 |

*Example 3*

| | Parts by weight |
|---|---|
| Calcium metaphosphate | 60 |
| Phosphate rock | 15 |
| Water | 25 |

The metaphosphate, rock and water is combined in the autoclave and subjected to a temperature of 259° F. and a pressure of 20 pounds per square inch for a period of 30 minutes. At the end of that time, the product is a dry, fully reacted solid fertilizer analyzing approximately 48% available $P_2O_5$.

Example 4

| | Parts by weight |
|---|---|
| Calcium metaphosphate | 200 |
| Phosphate rock | 50 |
| Water | 100 |

The ingredients are combined in the autoclave and subjected to a temperature of 259° F. and a pressure of 20 pounds per square inch for a period of 30 minutes. The final product is a dry, fully reacted solid fertilizer analyzing approximately 47% available $P_2O_5$.

Potassium metaphosphate and sodium metaphosphate behave in the process similarly to calcium metaphosphate, as seen in the following examples:

Example 5

| | Parts by weight |
|---|---|
| Sodium metaphosphate | 37.07 |
| Phosphate rock | 56.38 |
| Water | 6.55 |

The solid ingredients were blended in a laboratory scale bowl mixer, moistened with the water and then placed in the autoclave. Reaction was carried out for 30 minutes at 250° F. and 15 pounds per square inch. Six days after manufacture, the product analyzed 1.09% moisture, 30.45% available $P_2O_5$ and was basic to methyl orange.

Example 6

| | Parts by weight |
|---|---|
| Calcium metaphosphate | 70.18 |
| Phosphate rock | 14.82 |
| Water | 15.00 |

The metaphosphate and rock were blended in a laboratory scale mixer, moistened with the water and charged to the autoclave. Reaction was carried out for 15 minutes at 259° F. and 20 pounds per square inch pressure. One day after manufacture, the product analyzed 3.07% moisture, 48.35% available $P_2O_5$ and 3.6% acid to methyl orange as $H_2SO_4$.

The foregoing examples are chosen for illustration. In commercial practice, it is advantageous to carry out the process in a rotary autoclave, the product then being granular. All or part of the water may be added as injected steam. The ammonia is advantageously injected into the autoclave and may be entrained in the steam.

The reaction rate increases as temperature and pressure are increased. As a practical matter, the temperature may be carried to 350° F. (135.7 pounds per square inch), with reaction times then being as short as one minute.

I claim:

1. A method of making phosphatic fertilizers which is characterized by the steps of: admixing (1) a metaphosphate selected from the group consisting of calcium, sodium and potassium metaphosphates, (2) from one to four times the stoichiometric amount of water required for complete hydrolysis of said metaphosphate and (3) a basic fertilizer material; autoclaving said mixture under superatmospheric pressure and at an elevated temperature not exceeding 350° F.; and agitating said mixture during autoclaving, said agitation and autoclaving being continued until said metaphosphate is substantially completely hydrolyzed to a water-soluble orthophosphate, said basic fertilizer material neutralizing any acid formed by said hydrolysis reaction, said mixture being thereby converted to a substantially dry, fully reacted, soluble fertilizer without the addition of acid.

2. A method of making phosphatic fertilizers in accordance with claim 1 wherein said basic fertilizer material is an ammoniating agent.

3. A method of making phosphatic fertilizers in accordance with claim 1 wherein said basic fertilizer material is phosphate rock and wherein the molar ratio of phosphate rock to metaphosphate does not materially exceed 1:1.

References Cited in the file of this patent

UNITED STATES PATENTS

| Number | Name | Date |
|---|---|---|
| 446,815 | Glaser | Feb. 17, 1891 |
| 1,925,644 | Pristoupil | Sept. 5, 1933 |
| 2,064,979 | Kaselitz | Dec. 22, 1936 |
| 2,087,849 | Wilson | July 20, 1937 |
| 2,165,948 | Taylor | July 11, 1939 |
| 2,837,418 | Seymour | June 3, 1958 |

OTHER REFERENCES

Industrial and Engineering Chemistry, Development of Processes for Metaphosphate Productions, Copson et al., vol. 34, No. 1, January 1942, pages 26–39.